United States Patent
Aumeier et al.

(10) Patent No.: US 6,227,908 B1
(45) Date of Patent: May 8, 2001

(54) ELECTRIC CONNECTION

(76) Inventors: Wolfram Aumeier, Hohenlohenstrasse 49, 80637, Munchen; Bodo Bottcher, Schmatzenhohe 6, 95447, Bayreuth; Josef Harrer, Isarstrasse 45, D-83623, Ascholding, all of (DE)

( * ) Notice: Subject to any disclaimer, the term of this patent is extended or adjusted under 35 U.S.C. 154(b) by 0 days.

(21) Appl. No.: 09/230,296

(22) PCT Filed: Jul. 25, 1997

(86) PCT No.: PCT/GB97/02021

§ 371 Date: Jan. 22, 1999

§ 102(e) Date: Jan. 22, 1999

(87) PCT Pub. No.: WO98/05098

PCT Pub. Date: Feb. 5, 1998

(30) Foreign Application Priority Data

Jul. 26, 1996 (GB) .................................................. 9615747

(51) Int. Cl.[7] .................................................. H01R 13/648
(52) U.S. Cl. .......................................... 439/607; 439/186
(58) Field of Search ..................................... 439/607, 186

(56) References Cited

U.S. PATENT DOCUMENTS

| Re. 28,604 | 11/1975 | Kotski | 339/111 |
|---|---|---|---|
| 2,710,385 | 6/1955 | Sprigg | 339/61 |
| 2,783,391 | 2/1957 | Crever | 290/4 |
| 3,148,011 | 9/1964 | Brown | 339/218 |
| 3,353,144 | 11/1967 | Brookman | 339/217 |
| 4,153,319 | 5/1979 | Plyler et al. | 339/75 P |

FOREIGN PATENT DOCUMENTS 2 119 178   11/1983  (GB) .............................. H01R/13/53

Primary Examiner—Paula Bradley
Assistant Examiner—Tho D. Ta
(74) Attorney, Agent, or Firm—Myers Bigel Sibley & Sajovec

(57) ABSTRACT

Electrical interconnection arrangements are provided for connecting together two pieces of electrical equipment. A first connection component includes a first elongate conductive member, which in use is at a relatively high voltage, enclosed within insulating material. A portion of the first conductive member protrudes at one end beyond an end surface of the insulating material. The other end of the first member is arranged for electrical connection with one of the pieces of electrical equipment. One end of the first conductive member has an enlarged radiussed region within the insulating material adjacent the protruding portion to provide electrical stress relief at the exposed surface of the insulating material. A second connection component includes a second elongate conductive member enclosed within insulating material which has a socket exposed at an end surface thereof for receiving the protruding end of the first conductive member. The other end of the second member is arranged for electrical connection with the other of the pieces of electrical equipment. A respective conductive layer extends over the surface of the insulating material of each connection component at one end and extends therealong towards another end to provide electrical screening, each conductive layer terminating in respective first and second connection portions.

19 Claims, 10 Drawing Sheets

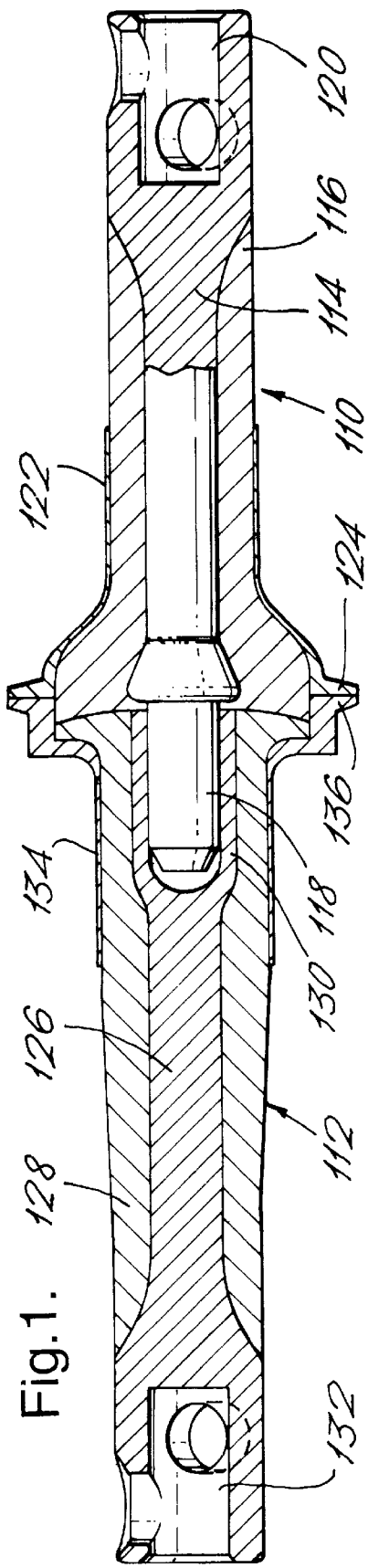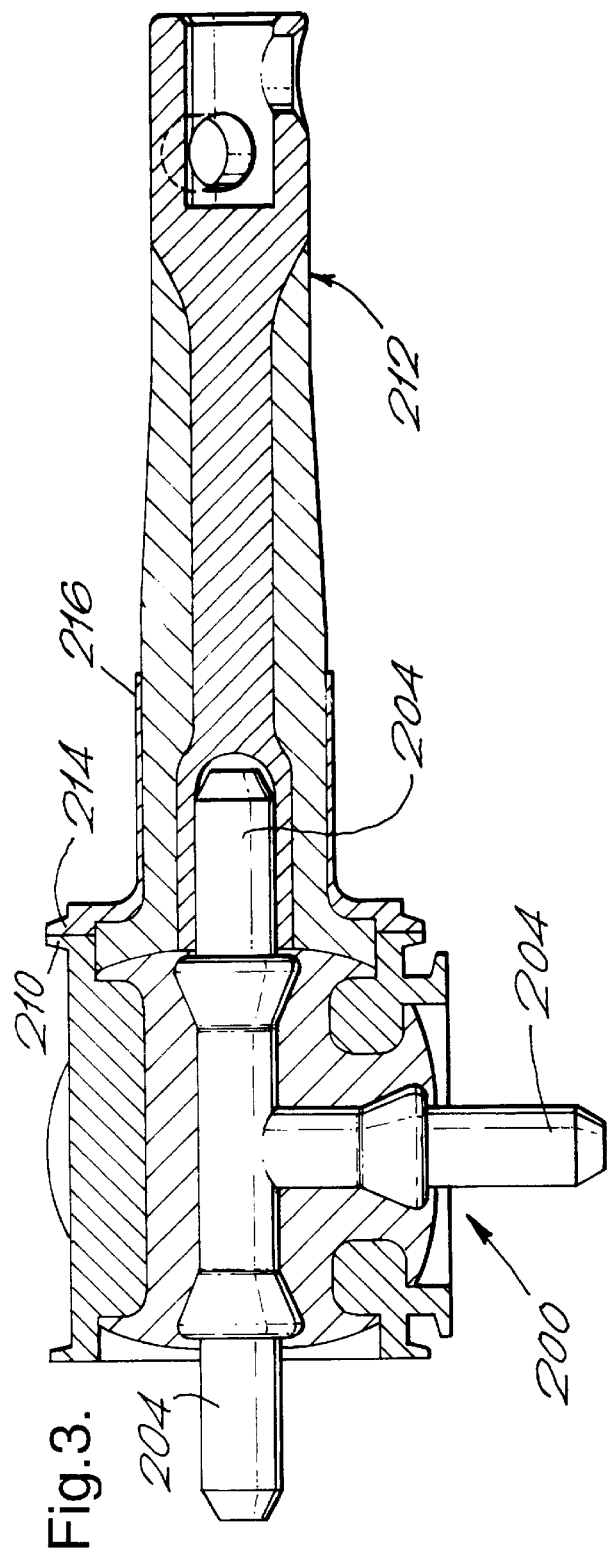

ELECTRIC CONNECTION

This invention relates to electrical connections and in particular to an electrical interconnection arrangement for making an electrical connection between at least one electrical cable and another piece of electrical equipment, which may be another cable, or may be a bushing of electrical switchgear or a transformer, for example.

The invention is particularly advantageous for use at rated voltages of 1 kV and above, and where the equipment is electrically screened. Furthermore, when used for connecting cables together, the invention is particularly advantageous for the formation of branch joints, but is also applicable to in-line joints.

Notwithstanding the above, and for ease of exemplification only, the invention will be further described mainly with reference to the formation of a branch joint.

Arrangements for forming branch joints are many and varied. EP-B-0070696 discloses a simple cable jointing connector comprising a solid electrically insulating body that encloses a plurality of bus bar conductors whose extremities project therefrom within extension insulators, for connection to conductors of cores of respective cables. Each connection is made by bolting a lug of the cable conductor to the extremity of the bus bar, and is then insulated by a sleeve, that is preferably heat shrinkable. The cables are physically isolated from each other, so that interconnection can be made between cables that would otherwise not be compatible physically and/or chemically, for example by being of different size, configuration or material. In this context it is mentioned that one common type of cable (paper-lead) is oil-filled and another (polymeric) has material that is susceptible to damage when contacted by oil. A disadvantage of this connector is that it is not electrically screened. Furthermore, when heat-shrinkable insulating sleeves are used to insulate the connection to the cables, disconnection can be inconvenient, and cannot be made without destroying at least part of the original connection.

U.S. Pat. No. 3,961,127 also discloses a universal power cable joint for use with power cables having various insulations, and thus has the versatility of the connection of EP-B-0 070696. However, this joint is much more complex, and relies on gasket seals to ensure chemical separation between the cables. Although disconnection can be effected without actual destruction of any components, the entire joint must be disassembled. Also, this joint does not provide a screened arrangement.

When installing an electric cable of a power distribution system, as well as the necessity usually for in-line joints, it is often necessary to install or to make provision for subsequent installation of a branch joint or service joint. A service joint is to be regarded as a particular form of branch joint, in which the service cable is of lower capacity than the main cable. It is thus especially advantageous to be able to make provision for adding one or more branch cables subsequent to the installation of the main cable. EP-B-0253670 discloses a suitable connector for doing this, and whilst having the advantage of simplicity and ease of re-entry and of addition of further branch cables, does not provide for screening of the connection.

It is to be appreciated that the need for screening of cables, and thus of connection therebetween, becomes more important at higher voltages, especially at rated voltages of about b 6kV and above, where touching the exterior of an insulated but unscreened cable can at least be unpleasant even if not dangerous. A connector that is screened, and that can be used with, i.e. electrically connected to, screened cables, is thus more versatile than one that is not.

It is one object of the present invention, to provide an electrical interconnection arrangement that is electrically screened, or shielded, that can be used with cables of various constructions, sizes and configurations, that is relatively easy to assemble and that can conveniently be disassembled if necessary.

In accordance with a first aspect of the present invention, there is provided an electrical interconnection arrangement for connecting together two pieces of electrical equipment, at least one of which may be an electrical cable, comprising: (a) a first connection component comprising a first elongate conductive member, which in use is at a relatively high voltage, enclosed within insulating material and protruding at one end beyond an end surface thereof, the other end of the first member being arranged for electrical connection with one of the pieces of electrical equipment, wherein said one end of the first conductive member has an enlarged radiussed region within the insulating material adjacent the protruding portion, thereby to provide electrical stress relief at the exposed surface of the insulating material, and (b) a second connection component comprising a second elongate conductive member enclosed within insulating material and having a socket exposed at an end surface thereof for receiving the protruding end of the first conductive member, the other end of the second member being arranged for electrical connection with the other of the pieces of electrical equipment; wherein a respective conductive layer extends over the surface of the insulating material of each connection component at its said one end and extends therealong towards its other end, thereby to provide electrical screening, which in use is substantially at earth potential, at said one end region of the component, each conductive layer terminating in respective first and second connection portions at respective one ends.

Thus, when the first and second conductive members interengage, to produce high voltage electrical interconnection between the two pieces of electrical equipment, the first and second connection portions also interengage, and can be secured together if necessary, to provide earthed electrical screening of the interconnection. Advantageously, the conductive members are, directly or indirectly, exposed at their other ends, proximate the electrical equipment beyond their respective insulating material and are electrically connected tO the conductive layers by electrical stress control arrangements, such as a layer of material, preferably polymeric, having stress control characteristics.

In this aspect, the invention is particularly suitable for forming an in-line connection between two cables, but it may also be used, for example, in connecting one cable to a bushing.

The invention is however also suitable for more versatile applications.

Thus, in accordance with a second aspect of the present invention, there is provided an electrical interconnection arrangement comprising: (a) a first, elongate, connection component comprising (i) a conductive member enclosed within insulating material and protruding from one end thereof, the other end being arranged for electrical connection to a conductor of a first piece of electrical equipment, for example, an electric cable, and (ii) a conductive layer extending over the surface of the insulating material at said one end and extending therealong towards the other end, thereby to provide electrical screening at one end region of the component, said conductive layer terminating in a connection portion at said one end; and (b) a second connection component comprising a body of electrically insulating material enclosing (i) an electrically conductive socket arranged to be electrically connected to other electrical equipment, and to receive and make electrical connection with the protruding end of the conductive member of the first connection component, and (ii) an electrically conductive structure located within the insulating body, spaced from and encircling the socket within and at a surface of the insulating body to provide an external connection portion, whereby on insertion of the conductive member of the first connection component into the socket of the second conduction component so as, in use, electrically to interconnect the electric cable to the other electrical equipment, the connection portions are arranged to co-operate to form an electrical connection therebetween.

Although as preferred and as set out for this aspect of the invention the first, elongate, connection component provides a protruding conductive member, and the conductive socket is provided within the body of electrically insulating material of the second connection component, it is to be understood that alternatively the protruding member may extend from the second connection component and the socket may be provided on the first connection component. The arrangement modified in this way, however, is not as compact as the former arrangement. Hereinafter for convenience, reference will be mainly made to further features of the former arrangement, but it is to be understood that they are applicable, with appropriate modification where necessary, also to the latter, mitrror-image arrangement.

The connection between the two pieces of electrical equipment is thus completely electrically screened. Although, as set out above, the other electrical equipment may be another electrical cable, and the connection may be an in-line joint, the invention is applicable to other configurations. For example, the second connection component may be a bushing, or otherwise may form part of equipment such as switchgear, a fuse or other form of circuit interrupter such as a vacuum chamber or an SF6 gas bottle, or a transformer, to which one or more cables may be attached. In general, an electrical component, for example a circuit interrupter, may be connected intermediate the two connection components of the invention.

When a cable is to be connected to one of the connection components, the connection portion, which may be a socket fitted with a shear head bolt, will be suitably shaped to receive the conductor, which may be circular or sector shaped for example. Furthermore, the arrangement may be used with any construction of cable, having any type of insulating material, polymeric or oil-impregnated paper, since the termination of the cable can be effected independently of its connection to the arrangement. With oil-impregnated insulation, for example, the termination may include an oil barrier such as a suitable heat-shrinkable tubing.

Advantageously, the protruding conductive member, for example said one end of the conductive member of the first connection component, has an enlarged radiussed region within the insulating material adjacent the protruding portion, thereby to provide electrical stress relief at the interface of the two connection components. Furthermore, that part of the conductive structure of the second connection component disposed within the insulating body preferably has radiussed edges, also to provide electrical stress relief at the interface of the two connection components. The presence of either, and preferably both, of these stress relief means thus not only reduces the electrical stress within the insulation of the respective connection component but also at the interface between the components. The radiussing may be achieved by the provision of a smooth toroidal configuration around the high voltage terminals within the respective insulating medium. The optimum radius of curvature needed, and the optimum distance away from the exposed surface at the interface, will depend on the electrical stress, and thus on the operating voltage, and can be determined from theory and experiment for any particular configuration. The reduction in stress has the practical advantage that the surface spacing between the conductive part at high voltage, that is to say the conductive member of the first component and the socket of the second component, and the screening parts, that is to say the conductive layer of the first component and the exposed portion of the conductive structure of the second component, can be less than it would otherwise have to be in order to prevent arcing or excessive leakage current flow therebetween. A more compact interconnection arrangement can thus be achieved.

Advantageously, in order to provide electrical continuity of the shielding between the first and second connection components, each connection portion comprises a mating flange, and the arrangement comprises clamping means to urge and to secure the flanges together, thereby to ensure electrical and mechanical connection between the or each first connection component and the second connection component. Advantageously, a seal, such as an O-ring seal, is provided between the flanges as part of the clamping means, to enhance moisture sealing of the interface.

A preferred arrangement of the second aspect of the invention comprises at least one further first connection component, wherein the second connection component comprises at least one further said electrically conductive socket that is electrically connected within the insulating body to the said socket and that is arranged to receive the further first connection component, and wherein the electrically conductive structure extends so as to be spaced from and to encircle the further first socket within and at a surface of the insulating body so as to provide a further external connection portion for co-operating with the connection portion of the further first connection component, thereby electrically to interconnect the electric cable with other electrical equipment connected to each of said first sockets.

Advantageously, the insulating body is multi-faceted, preferably having six faces and being generally cubic for example, having one of said sockets and associated connection portions exposed at respective faces thereof for electrical connection to respective first connection components. Other shapes of multi-socketed components, including spherical are, however, also envisaged. Such an arrangement is particularly suited for use in forming branch joints. Two first connection components may be connected to respective lengths of main cable, and one or more branch cables may be connected to respective ones of other first connection components. The first connection components need not be identical with each other. One type may be arranged to extend substantially linearly away from the second connection component, and would be particularly suitable, for example, for the main cable lengths and for a branch cable extending at right angles thereto. Another type may be of substantially L-shape such that its associated cable extends, for example, parallel with or perpendicularly to the main cable at a different level. The second connection component may be substantially rectilinear, for example cubic, and may have sockets to provide for connection to two main cable lengths and up to three branch cables.

Two, or more, of the multi-socketed second connection components of the second aspect of the invention may be ganged together, that is to say they may be physically and electrically directly connected together, to provide for a larger plurality of connections to respective first connection members.

The interface between the or each first connection element and the second connection element should be such as substantially to avoid entrapment of air. To this end, the hardness of the abutting insulating materials can be chosen to suit, and/or a sealant, for example a gel, may be provided as part of one or the other component or of both components, or may be provided separately at the interface. Alternatively or additionally, the mating surfaces may be curved and have slightly different curvature such that on bringing them together air is exuded.

The curvature of the interface assists in disconnection, in that separation of the two components takes place in a peeling mode rather than a shearing mode, with the consequential reduction in force needed. Although it is preferred that both abutting surfaces are curved, and are of slightly different curvature, it is envisaged that only one may be curved whilst the other is planar, and also that both surfaces may be planar. The interface may be convoluted so as to increase the creepage path length for any flow of current between the high voltage conductors and the earthed screening conductors.

The arrangement advantageously is such that an electric cable is connected to said other end of the, or a respective one of each, conductive member of a first connection component, wherein electric stress control material extends in electrical contact from the conductor of the cable to the conductive layer of the first connection component, which stress control material is enclosed by insulating material and by conductive material that is in electrical contact with the conductive material of the first connection component. Advantageously, the conductive member is solid and has a female socket at its cable connection end for receiving the conductor of the cable. It will thus be appreciated that a screened cable of any size, construction or configuration may be terminated by any suitable means on to the other end of the first connection component, that is to say that end that in operation is remote from the second connection component. Heat shrink technology can be employed for such cable termination, without detracting from the ease of disassembly of the connection between one cable and another by means of the second connection component, since the interconnection between the first and second components is made and broken by means of a pin and socket push-fit type of contact. However, it is also envisaged that other technologies may be employed, i.e. without the use of heat, including elastomeric, push-on and tape technologies.

When the number of pieces of equipment, such as cables, that need to be interconnected is less than the number of sockets provided on the second connection component, the excess sockets may be closed off by closure caps. The closure cap may comprise an insulating body, a projection, that preferably is electrically conductive, extending from the cap insulation body so as mechanically to engage the socket, and an electrically conductive member for electrically engaging with the conductive structure of the insulating body of the second connection component. It will be appreciated that a socket may be fitted with a closure cap initially or temporarily, and that the cap may be removed at any time and replaced by a first connection component, which may be attached to a cable, for example, in order to add a branch line to the power distribution system of the main cable.

Advantageously, at least one of the connection components or of the closure caps comprises an external test point that is electrically, preferably capacitively, coupled to its respective terminal, when that component or cap is mounted on the connection component. As well as the detection of voltage, it is also envisaged that sensors may be included to detect and measure current. Advantageously, the sensors are non-linear active fibreoptic sensors operating substantially at earth potential, using one or more of the Faraday, Kerr, and Mach-Zehnder effects. Magnetic effect sensors using the Hall effect may also be used, involving a Hall effect integrated circuit or a LOHET. The direction of current flow, for example in the event of a short circuit to the earthed screening cage of the second connection component, may be sensed by suitable coil windings, for example around the sockets, or other terminals, of the second connection component.

As described, the arrangements of the invention are dis-connectable when there is no power supplied to the connection components. In some instances, however, it may be desirable to disconnect whilst the arrangement is still under power, and then precautions must be taken to avoid the formation of an arc, or to reduce its effects. To this end, the surfaces of the conductors to be disconnected may be coated with an arc ablative material, such as Celcon or Melamine, which would be suitable for relatively low currents.

By providing a suitable interconnection, male/female, component, it will be appreciated that two (or more) of the second connection components may be stacked together, thereby conveniently to increase the number of cables, or other electrical equipment that may be interconnected.

Any suitable insulation material may be selected for the interface regions and/or the entire mass of the connection components, including, for example, epoxy resins, rubbers or elastomers, such as EPDM or silicone, of a range of hardnesses, or a thermoplastic material. Particularly if a thermoplastic material is selected, it may be advantageous to provide at its surface a layer of grease or a gel in order to improve the interfacial sealing and the dielectric strength at the interface. Such provision may also be made if other materials are selected.

Since the electrically conductive structure of the second connection component is provided solely for electrical screening and stress control purposes, and is not required to be robust so as to carry any significant current, it can be made very lightweight, and is preferably a hollow structure, made for example from stainless steel, corrosion protected aluminium, bronze, or a conductive polymer. It may be provided as a moulding within the insulating body, or as a foil, for example. The electrical screening of the arrangement may be provided by the spraying of suitable material or by electrodeposition.

The socket of the second connection component is advantageously formed from a metal tube that is silver coated and has a multi-contact lamella for good electrical contact at high current levels. When two or more sockets are provided, the tubes may be welded together.

It is thus seen that the present invention is arranged to provide an electrical interconnection arrangement that (i) is compact, (ii) is versatile in that it can be used with various numbers of pieces of electrical equipment, e.g. cables, that are of different size, construction and configuration, (iii) allows a cable to be added or removed at any time without interfering with the other cables, (iv) is electrically screened, and (v) can conveniently be provided with electrical stress relief in areas of high field strength.

The compactness of the arrangement that results, at least in part, from the electrical screening and stress relief provided, allows the physical separation between cables to be reduced, which is very advantageous when space has to be created by digging a trench in the earth for laying the cables, and when space is very much restricted such as when jointing is carried out in a manhole. Furthermore, the consequence of being able to operate with a relatively small interface at the interconnection is that disconnection, both mechanically and electrically under load, is facilitated.

The arrangement of the present invention, whilst being suitable for use at lower voltages, finds particular application at power distribution system voltages of 12 kV, 15 kV, 17.5 kV, 24 kV and above.

Interconnection arrangements, each in accordance with the present invention, will now be described, by way of example, with reference to the accompanying drawings, in which:

FIG. 1 is a section through a generally cylindrical in-line cable interconnection arrangement;

FIG. 3 is a section through one form of branch interconnection arrangement using the connection component of FIG. 2;

Figure 2:
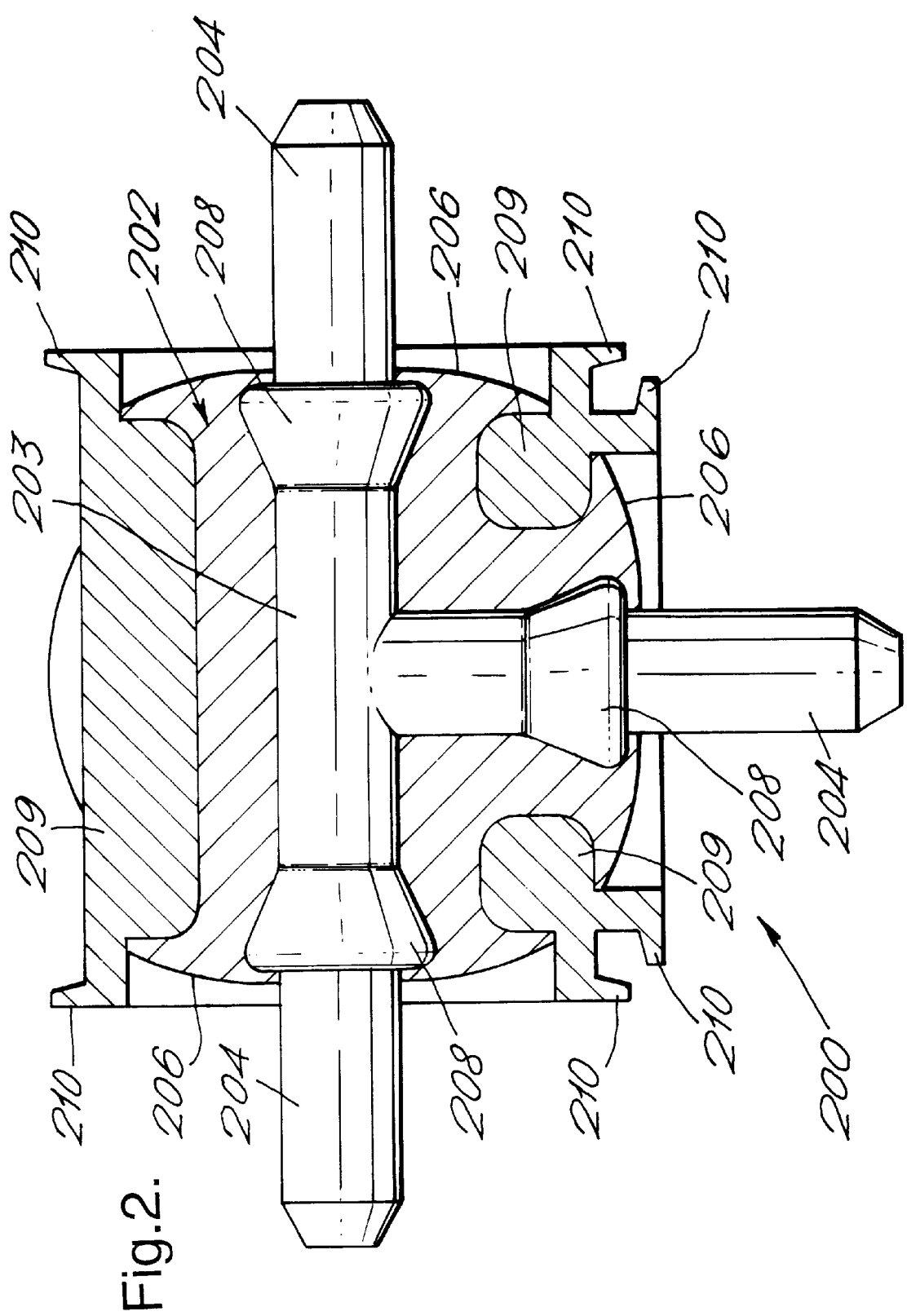
FIG. 2 is a section through a connection component for a branching arrangement.
Figure 4:
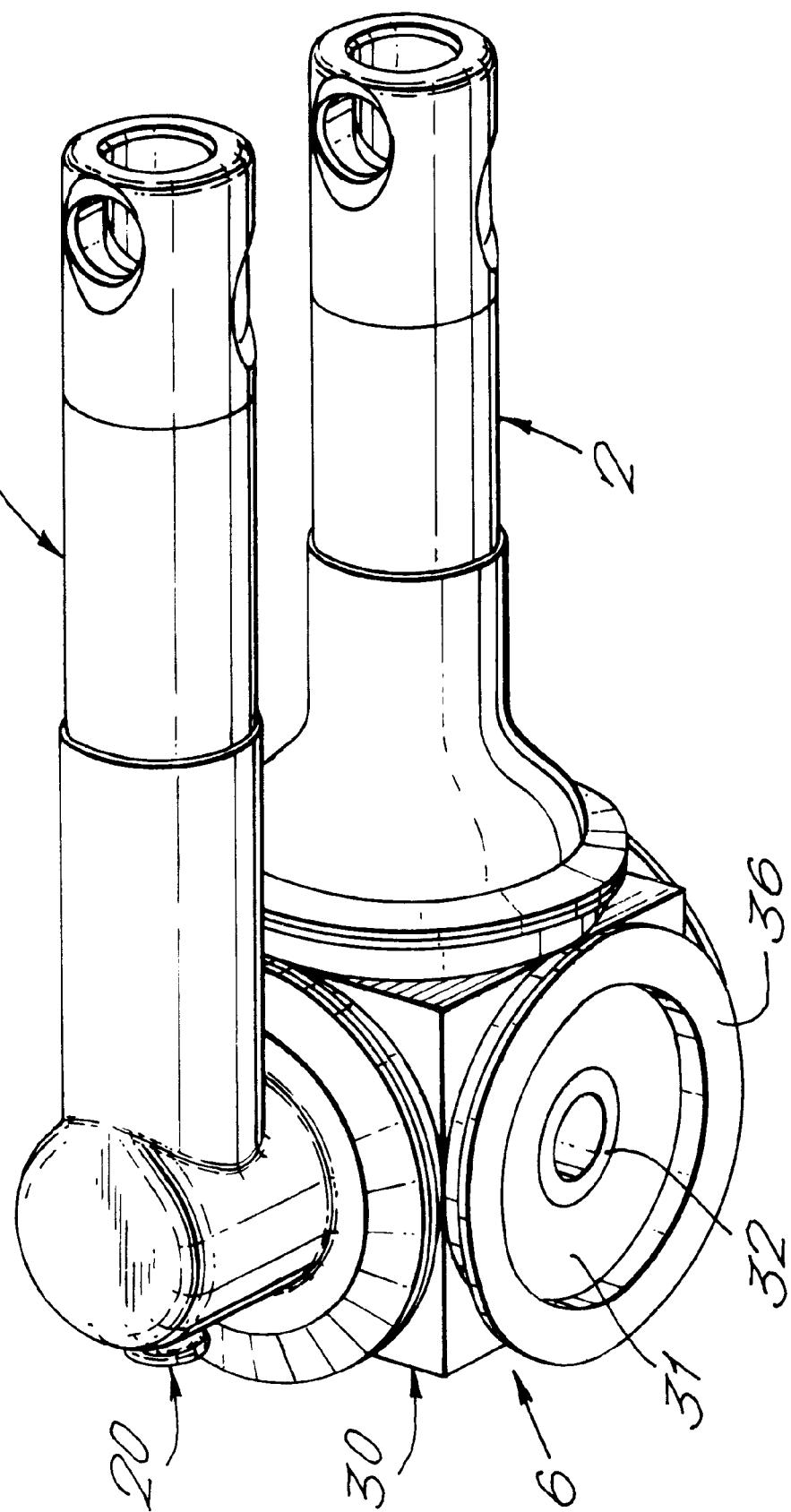
FIG. 4 is an isometric view of an arrangement showing two different first connection components connected to a second connection component.
Figure 5:
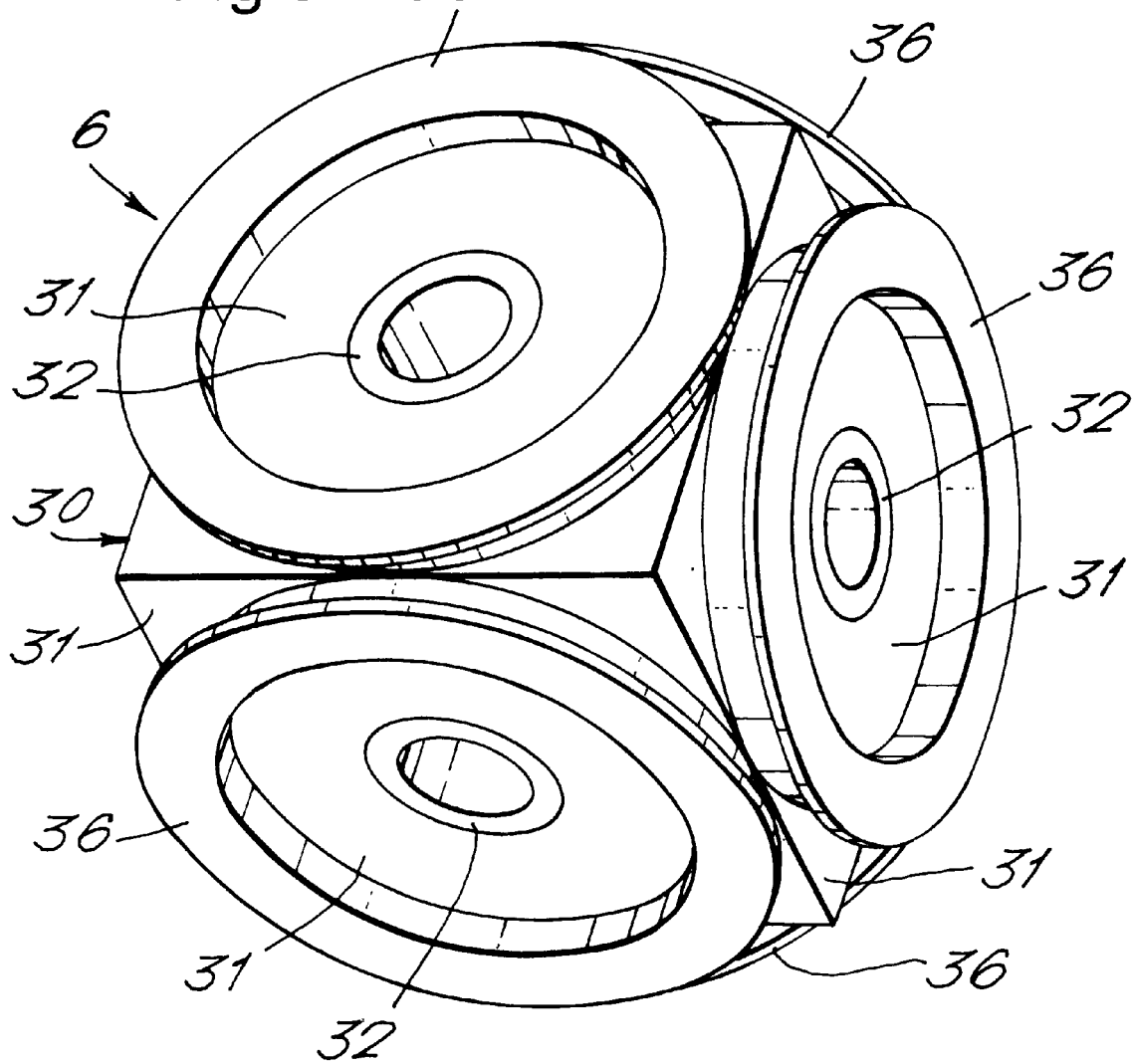
FIG. 5 shows an enlarged isometric view of the second connection component of FIG. 4.
Figure 6:
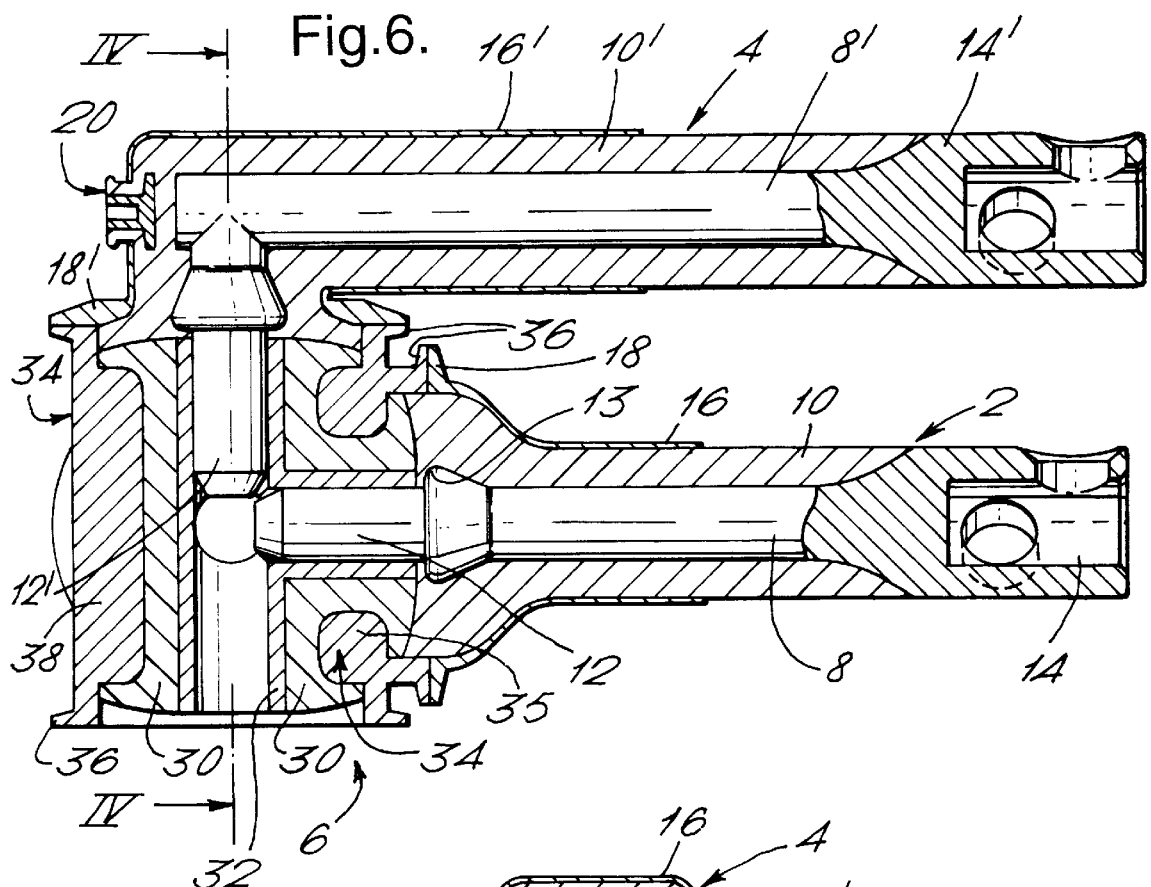
FIG. 6 is a vertical section through the arrangement of FIG. 4.

Referring to FIG. 1, the interconnection arrangement shows two elongate connection components 110, 112 electrically interconnected. Component 110 has a metal conductor 114 extending therealong within insulating material 116 with a pin 118 protruding therefrom at one end. At its other end, beyond the insulating material 116, the conductor 114 terminates in a socket 120 for receiving the conductor of a high voltage cable (not shown). At the pin end of the component 110, the insulation 114 is radially enlarged and carries a conductive screening layer 122 on its outer surface, the layer terminating in a radial flange 124. The conductor 114 is radially enlarged and radiussed within the insulation 116 adjacent the pin 118, so as to distribute electrical stress more evenly over the exposed annular end surface if the insulation 116. The component 112 has a corresponding metal conductor 126 encased within insulating material 128. The conductor 126 terminates at one end in a socket 130 that receives the pin 118, and at its other end is a socket 132 for receiving the conductor of a further cable (not shown). The component 112 is also provided with an outer conductive screening layer 134 terminating in a flange 136 at a radially-enlarged insulating portion around the socket 130.

The exposed mating annular surfaces of the components 110 and 112 are curved so as to assist in the exclusion of air pockets at the interface when the pin 118 is fully mated within the socket 130 and when the outer flanges 124 and 136 are in abutment. The curved insulating interface is offset from the annular interface of the flanges 124, 136 so as to avoid a direct path from outside the components 110, 112 to the inner high voltage conductor connection. Conductive layers 122 and 134, together with the flanges 124, 136 provide screening of the interconnection, as described hereinafter. Advantageously, an annular clamp (not shown) can be applied around the flanges so as to enhance the mechanical strength of the interconnection.

A compact, low profile, screened and stress controlled in-line splice can thus be formed by the arrangement of FIG. 1 when respective cables are connected to the sockets 120 and 132 thereof.

FIGS. 2 and 3 show an arrangement, which uses a component similar to one of the components of FIG. 1 together with a second component, suitable for making a branch joint.

FIG. 2 shows a section through a connection component 200 having a generally cubic insulating body 202 that has embedded therewithin a metal core 203 that has five pins 204 (only three of which are shown) projecting from respective curved faces 206 thereof. Electrical stress control of the curved insulating surfaces 206 is provided by enlarged and radiussed regions 208 of the core 203 there within proximate the pins 204. The insulating body 202 also carries an integral insulating, metal screening structure having limbs 209 that terminate in external connecting flanges 210 that surround the pins 204 at each surface 206.

In FIG. 3, an elongate cable connecting component 212 is shown fitted to one of the pins 204 of the component 200. Connecting component 212 differs from the component 112 of FIG. 1 only in that its mating insulating surface is concave rather than convex, in order to mate with the convex outer surfaces 206 of the insulating body 202, and so will not be further described in detail. The flange 214 of the screening layer 216 of the cable connecting component 212 is connected to the flange 210 surrounding the associated pin 204, and thus continues the earthed electrical screening to the structure 209 of the component 200. It will be appreciated that further cable connector components 212 will be connected to the other pins 204 as needed to make further cable connections.

Referring to FIGS. 4 to 8, two first connection components, or terminations, 2, 4 and one second connection component, or adapter 6 are shown, for a 15 kV power distribution system.

The termination 2 is substantially linear and of substantially circular section, comprising a metal core 8 enclosed within insulation 10. At its forward end, the core 8 projects beyond an end face 11 of the insulation 10 to provide a pin 12 for connection to the adapter 6. Adjacent the pin 12, but still whilst encased within the insulation 10, the conductive core 8 is flared outwards at 13 to provide an electric stress relief configuration of general frusto-conical configuration whose base, adjacent the end face 11, is radiussed to enhance the stress relief at the face 11. The end face 11 is curved for mating with an exposed insulating surface of the adapter 6. At its rearward end, the core 8 flares outwards to a larger diameter female socket 14 beyond that end of the insulation 10.

A conductive layer 16 (FIG. 8) extends from approximately halfway along the outer surface of the insulation 10 towards the forward end of the termination 2 and at the flared insulation portion and slightly spaced away from the end face 11, extends outwards to form, or to extend over the outer surface of, a radial annular flange 18 for connection to the adapter 6.

The termination 4 is functionally similar to the termination 2, but differs structurally in that instead of being linear, it extends in a generally L-shape. Corresponding components are denoted with a dash. As shown, the termination 4 also exemplifies a connection component that is fitted with a capacitive test point 20. The test point 20 is embedded in the insulation 10' to dispose a conductive socket contact 22 spaced from the conductive core 8' so as to be capacitively coupled thereto. In known manner, the test point 20 can indicate whether the associated core 8' has a voltage applied to it or not.

The adapter 6 has a generally cubic insulating body 30 with an identical double electrode system exposed at each of five of its faces 31. The high voltage electrode system comprises five tubes acting as sockets 32 that are welded together, moulded into the body 30 and exposed at faces thereof. Also embedded within the insulating body 30 and spaced from and extending around each socket 32, there is a conductive cage structure 34, that forms an earthed, screening and electrical stress relief electrode system. The arms 35 defining the cage are radiussed so as to alleviate electrical stress around the sockets 32, and at the faces 31. The conductive structure 34 extends beyond the insulating body 30 so as to dispose an annular flange 36 spaced from and encircling each socket 32 and extending away from each body face 31. The sixth, unsocketed, face 31 of the insulating body 30 may conveniently comprise a conductive plate 38 (FIG. 6) of the cage 34.

The exposed faces 31, at least in those regions that lie annularly between each high voltage socket 32 and earthing electrode ring 36, are curved for engagement with the respective mating faces 11, 11' of the terminations 2, 4 and are of a slightly different curvature therefrom.

Interengagement of the termination 2, 4 and the adapter 6 takes place by inserting the termination pins 12, 12' into respective ones of the sockets 32 as push fits, with either or both of the pins and sockets being provided with multi-lamella contacts, to make the high voltage interconnection therebetween. This action brings the termination insulating surfaces 11, 11' into contact with respective faces 31, and, with the radius of curvature of the concave surface 11, 11' being greater than that of the convex surface 31, air therebetween will be exuded from the interface. This action also brings the termination screening flanges 18, 18' into abutment with respective ones of cage flanges 36. An annular clamp (not shown) is fitted around the mating flanges so as to ensure good mechanical and electrical interconnection therebetween.

With the terminations 2, 4 mounted on the adapter 6, it is thus seen that (i) a high voltage conductive path is established between the core 8, pin 12, a first socket 32, a second socket 32, pin 12' and core 8'; and (ii) a screening conductive path is established between the conductive layer 16, flange 18, a first flange 36, cage 34, a second flange 36, flange 18' and conductive layer 16'. Furthermore, the provision of the continuous screening layer, which is practice is maintained at earth potential (by an electrical connection, not shown), allows the outer surfaces of the interconnected terminations 2, 4 and adapter 6 to be touched in safety. Also, the electrical stress relief provided by the radiussed flared portions 13, 13' of the terminations and the radiussed cage arms 35 around the cores 8, 8' and sockets 32 respectively, allows a compact arrangement, i.e. a short length, of interfaces 11, 11' and 31 to be employed.

FIG. 3 shows an arrangement in which only two terminations are interconnected, but it will be appreciated that a larger number, up to five, may be interconnected by the exemplified adapter 6. It will also be understood that the orientation of the terminations may be varied. For example, termination 4 may be disposed such that it extends parallel to the termination 2 in the opposite direction, at right angles to it to one side or the other, or at any other angular orientation, whilst maintaining the same electrical interconnection thereto.

Figure 8:
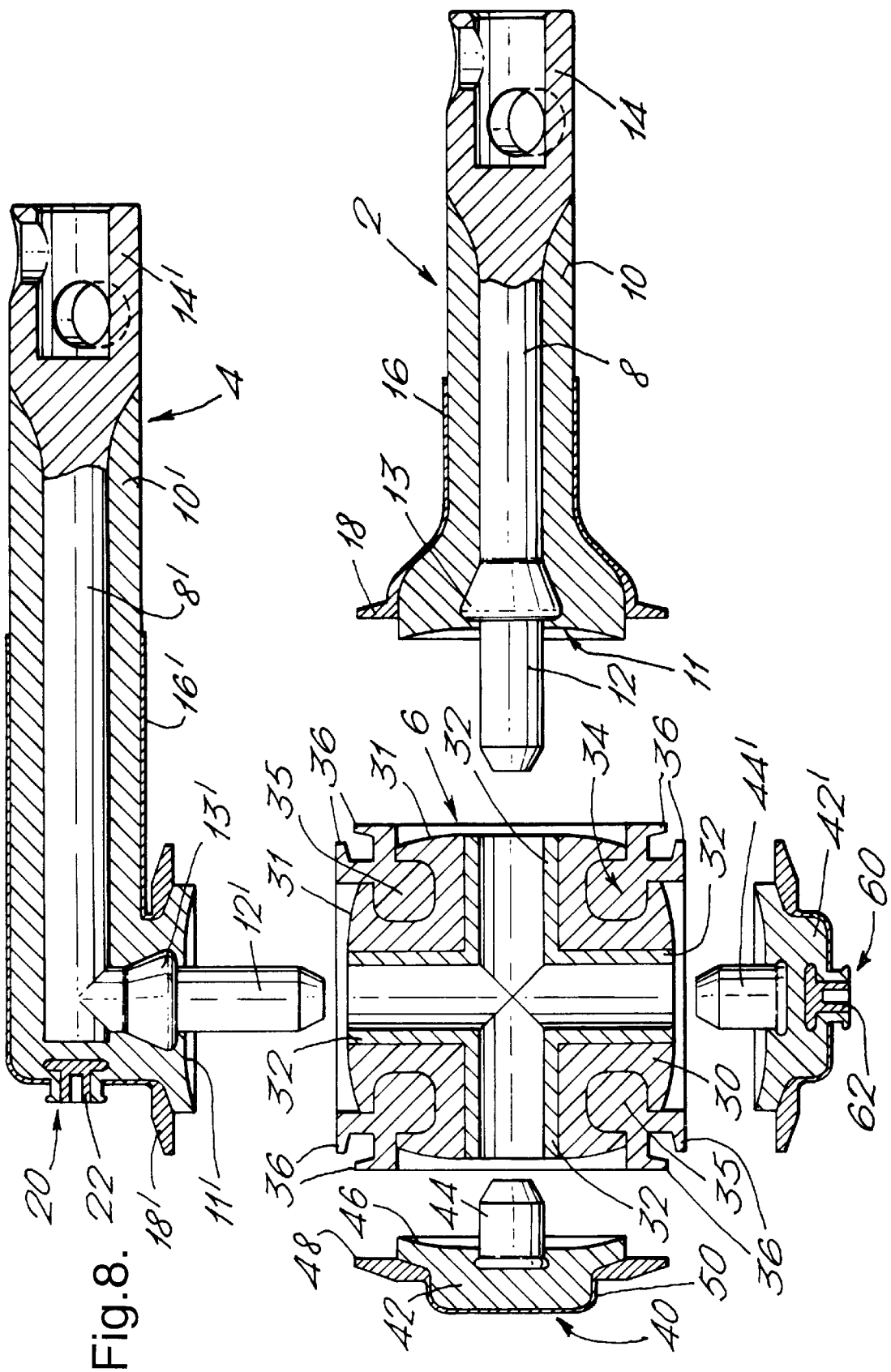
FIG. 8 is an exploded view in section of the arrangement also showing two closure caps for the second connection component, which is shown in a different orientation.

When there is a need for terminations to be connected only to some of the sockets of the adapter, the unused sockets are preferably closed off. Referring now to FIG. 8, a first closure cap 40 for a socket 32 comprises an insulating body 42 that has a short conductive pin 44 embedded therein and projecting from a curved front surface 46 thereof. The cap 40 has an annular conductive flange 48 for mating with an adapter flange 36, and a conductive layer 50 on its remaining outer surface. The unused socket 32 thus receives the short pin 44 and the flanges 48 and 36 are secured together by an annular clamp (not shown). Also in FIG. 5, there is shown a closure cap 60 that is modified from the cap 40 only by the provision of a test point 62, similar to the test point 20 of the termination 4, located in its insulating body 42' so as to be capacitively coupled with its pin 44' and thus the adapter sockets 32.

Figure 9:
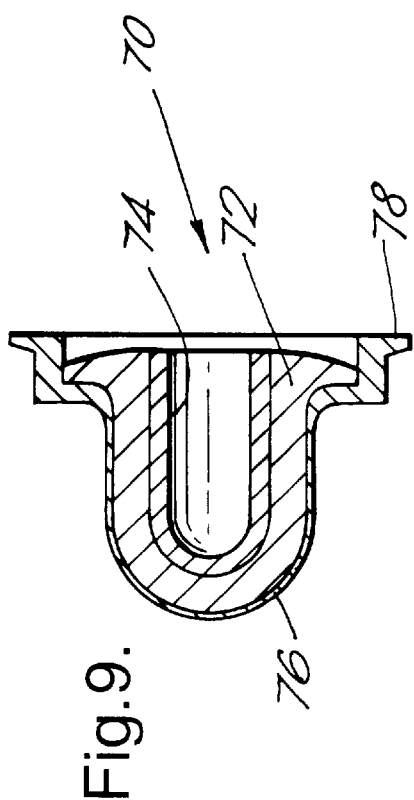
FIG. 9 shows in section a closure cap for a first connection component.

FIG. 9 shows a closure cap 70 suitable for mounting on the forward end of a termination 2, 4 so as to insulate its pin 12, 12', which may still be at high voltage, when the termination is not mounted on the adapter 6. The pin 70 is generally of closed cylindrical configuration, comprising an insulating body 72 with a conductive socket 74 located therewithin, and having an outer conductive surface 76 connected to an annular metal flange 78. The flange 78 is arranged to mate with a termination flange 18, 18', and to be clamped thereto, with the exposed surface of the insulation 72 mating with the termination surface 11, 11'.

Figure 10:
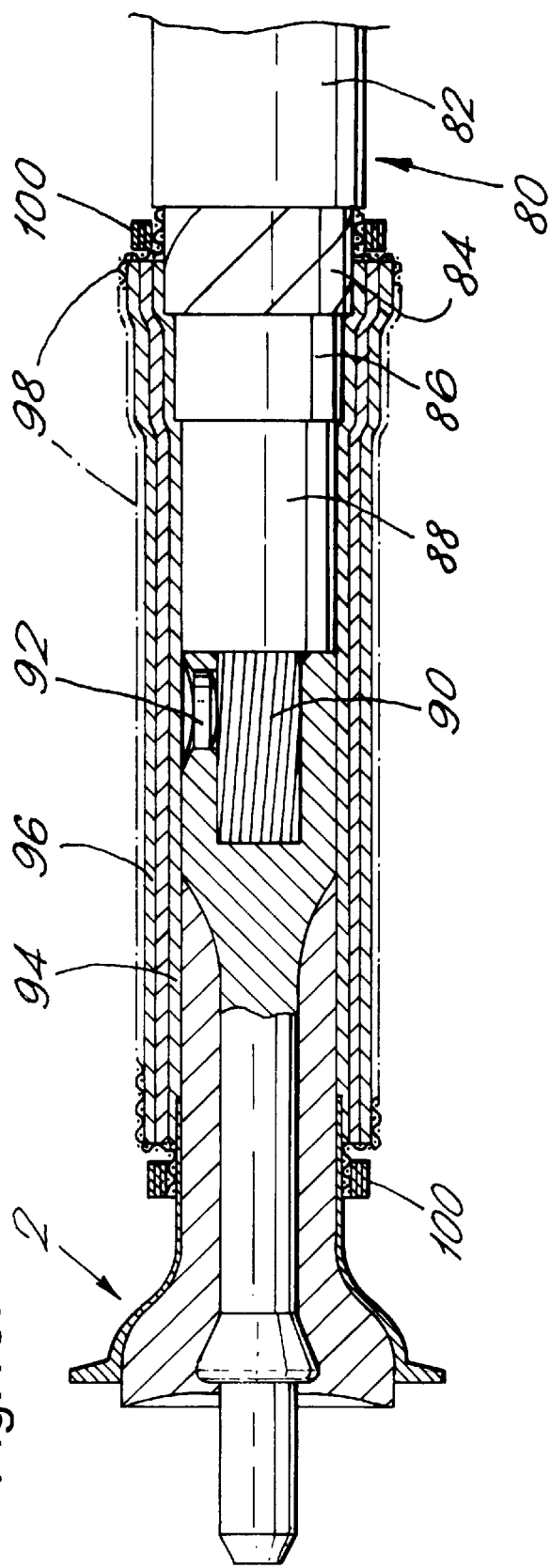
FIG. 10 shows a connection of a first connection component to a power distribution cable.

The interengagement of first connection components, exemplified by the terminations 2, 4, and a second connection component, exemplified by the adapter 6, has now been described. It is envisaged that one of the sockets of the second connection component may be connected to or form part of electrical equipment such as switchgear, but a more general application of the second connection component will be to interconnect several electric cables to each other, each cable being connected to a respective first connection component. FIG. 10 exemplifies the connection of a screened 15 kV polymeric cable to the termination 2.

Referring to FIG. 10, the cable 80 is prepared for termination or jointing in accordance with standard procedures. Thus, the outer insulating sheath 82 is cut back to expose the underlying metal shielding layer 84, which is cut back to expose the underlying semiconductive screen layer 86, which is cut back to expose the underlying insulating layer 88, leaving an end portion 90 of the conductor exposed. Conductive paint (not shown) is applied over the small step at the exposed end of the screen 86. The conductor 90 is inserted into the female socket 14 of the core 8 of the termination 2, and secured in place by a transverse shear-heat bolt 92. Void filling mastic (not shown) is applied around the connection of the conductor 90 to the socket 14. Prior to making this connection, two polymeric heat shrinkable tubular sleeves 94, 96 had been slid along the cable 80. The inner sleeve 94 having electrical stress control characteristics is now slid over the connection and heat is applied to it to cause it to shrink into position so as to overlap the termination outer conductive layer 16, to extend along the exposed termination insulation 10 and over the socket 14, and then to extend along the cable insulation 88, over the screen 86 and to overlap the cable shield 84. The outer tube 96 is then slid into position over the tube 94 and shrunk into position co-terminously therewith. The tube 96 is co-extruded, the inner component of which is insulating whilst the outer component is conducting. Continuity of the shielding across the connection of the cable 80 to the termination 2 is provided by a copper mesh strip 98 that is helically wound around the outer surface of the tube 96 along the whole of its length, and that extends down onto the metal cable shield 84 at one end and down on to the termination conductive layer 16 at its other end. At each end, the mesh 98 is secured to its underlying component by a metal roll spring 100. In this way, the high voltage conductor 90 and the earthed outer shield 84 of the cable 80 are electrically connected respectively to the conductive core 8 and outer shielding layer 16 of the termination 2.

Figure 11:
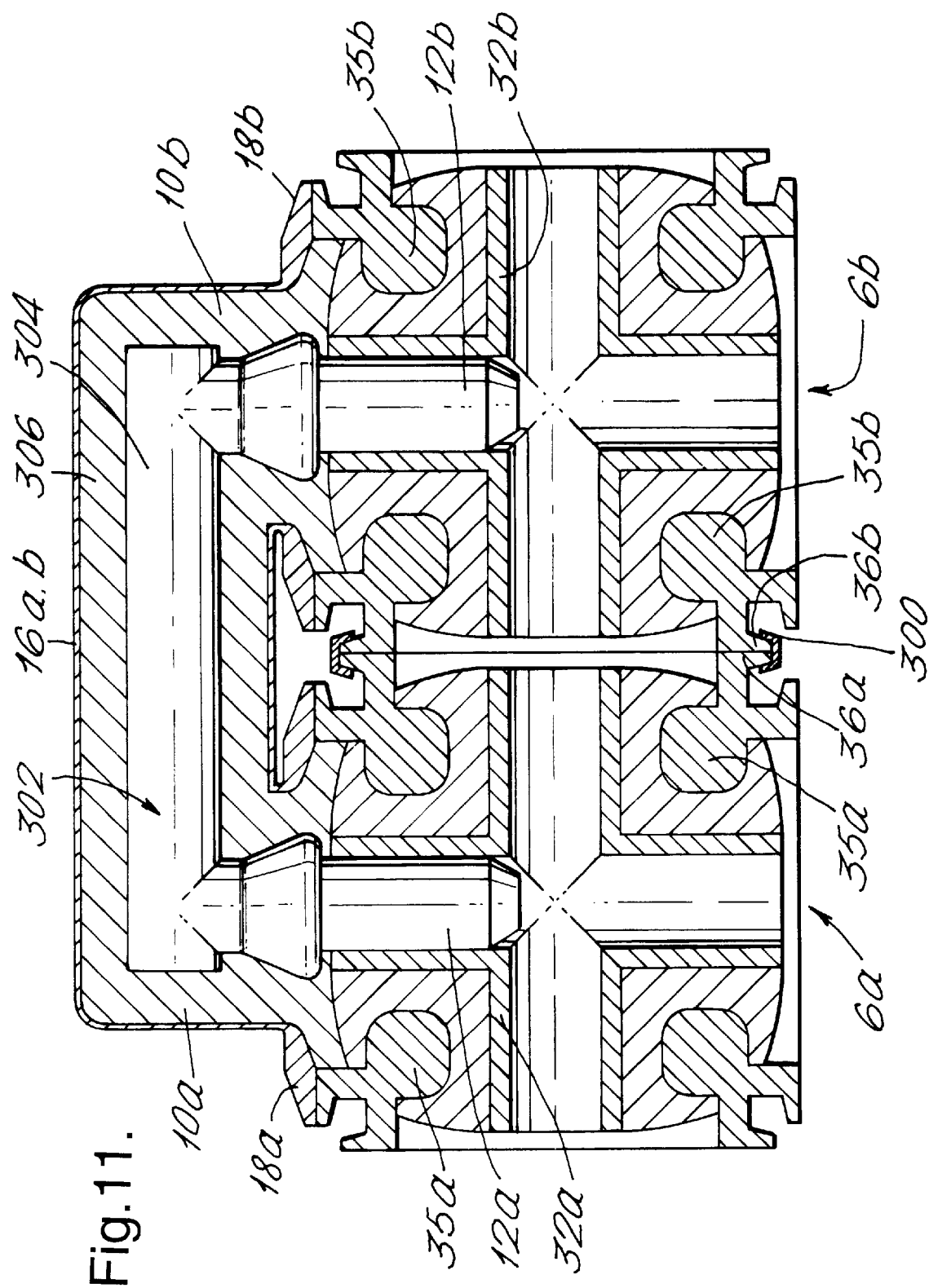
FIG. 11 is a section through a further pair of ganged connection components.

FIG. 11 is a section through two second connection components, each of which is essentially the same as that described with reference to FIGS. 4 to 8 above, and which are ganged together to provide a larger number of possible interconnections. Thus, for convenience, where applicable like parts are indicated by like reference numerals with the addition of a suffix 'a' and 'b'.

The second components, or adapters, 6a and 6b are placed side-by-side with one pair of adjacent annular screening flanges 36a, 36b in abutment and, optionally, are secured together by a circular clamp 300. One socket 32a of the adapter 6a is electrically connected to a socket 32b of the adapter 6b by a bus bar conductor 302. The bus bar 302 has a pin 12a, 12b at its ends for engagement with the sockets 32a, 32b respectively, the pins being flared within their enclosing insulation 10a, 10b and being surrounded by annular screening flanges 18a, 18b. The pins 12a, 12b are integral with an intermediate metal connecting rod 304 that is contained within insulating material 306 that is integral with the pin insulation 10a, 10b. The outer surface of the insulation 10a, 10b, 306 is enclosed within a conductive screening layer 16ab that is integral with the flanges 18a, 18b. The five sockets 32a of the adapter 6a are thus electrically connected to the five sockets 32b of the adapter 6b by means of the pin 12a, bus bar 304 and pin 12b; and the earthed screening cage structure 35a of the adapter 6a is electrically connected to the cage structure 35b of the adapter 6b not only by the abutting flanges 36a and 36b, but also by the pin and bus bar screening comprising the flanges 18a, 18b and the conductive layer 16ab. Thus, three pieces of electrical equipment can be connected into the three available sockets of each of the adapters 6a and 6b, and at least some of the pieces may be electric cables connected by means of first connection components such as terminations 2 or 4.

It is envisaged that the central opposing sockets 32a, 32b may also be directly interconnected by a conductor, for example a bus bar, extending therebetween, or alternatively they may be closed off.

It will be appreciated that with suitable modification, three or more adapters may be ganged together.

Figure 12:
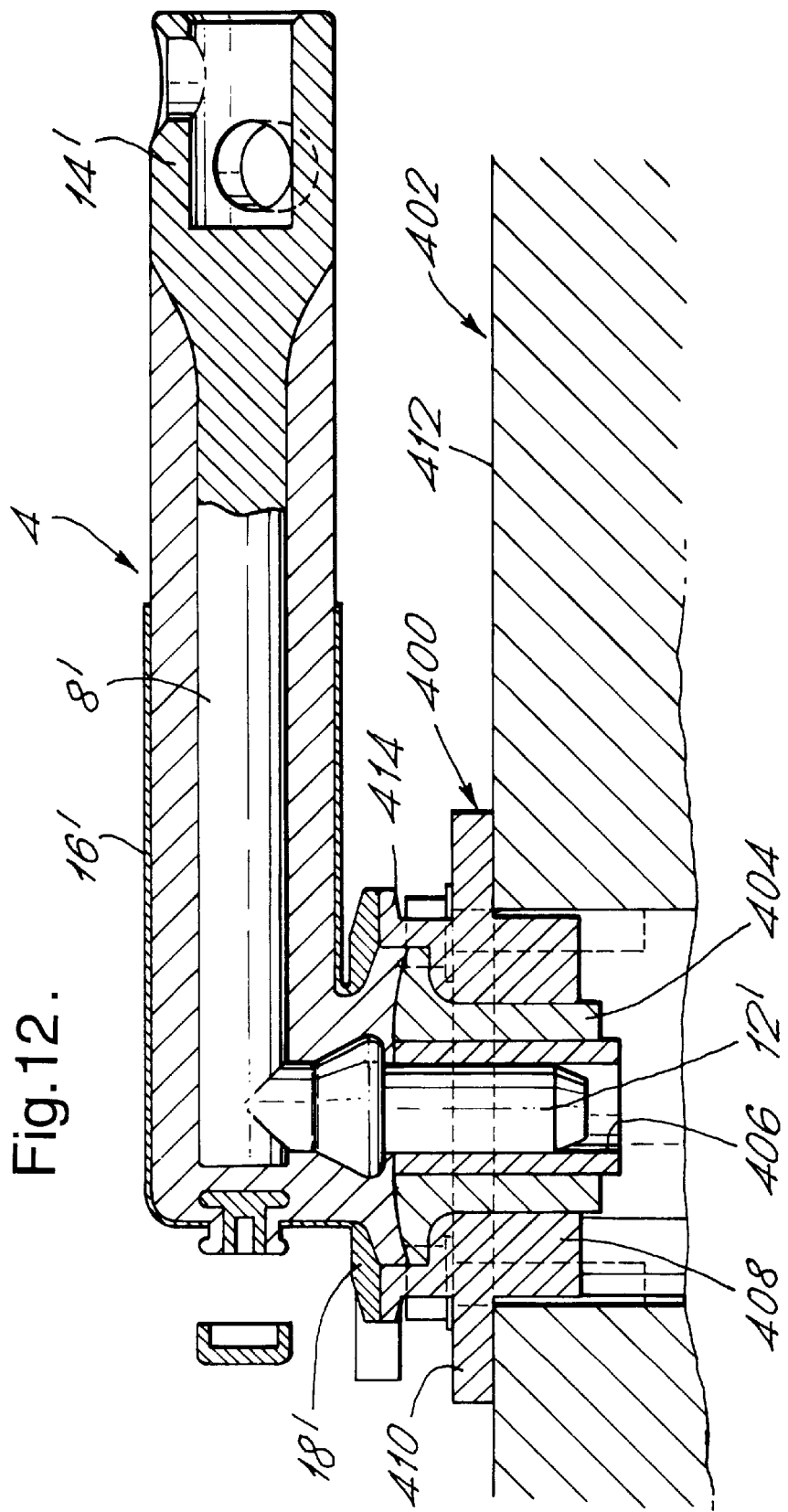
FIG. 12 is a section through a modification of the arrangement of FIGS. 6 to 8.

FIG. 12 shows the termination connection component 4 of FIGS. 4 to 8 co-operating with another connection component 400 that is in the form of a generally cylindrical bushing of switchgear 402. The bushing 400 has an insulating body 404 that carries a tubular conductive socket 406 that receives the termination pin 12. The bushing insulation 404 is contained within an annular metal collar 408 that has a first flange 410 by which it is secured and earthed to the metal housing 412 of the switchgear 402, and a second flange 414 that engages with the screening flange 18 prime of the termination 4. Thus, the high voltage path through the arrangement extends from a cable (not shown) fitted into the termination socket 64 prime, along the core 8 prime to the pin 12 prime, and thence to the bushing socket 406 that is electrically connected within the switchgear 402. The earthed screening path extends from the termination outer conductive layer 16 prime to the flange 18 prime and thence to the bushing housing 412.

Figure 7:
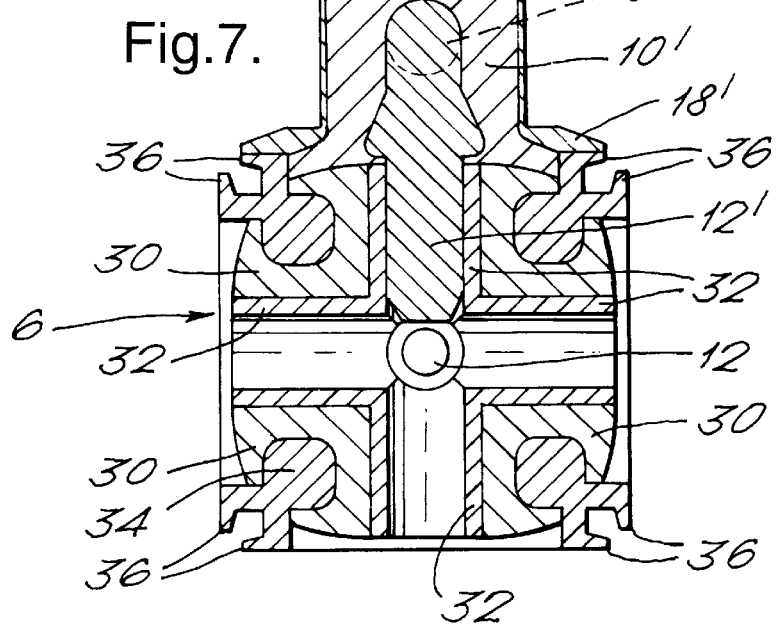
FIG. 7 is a section along the line IV—IV of FIG. 6.
Figure 13:
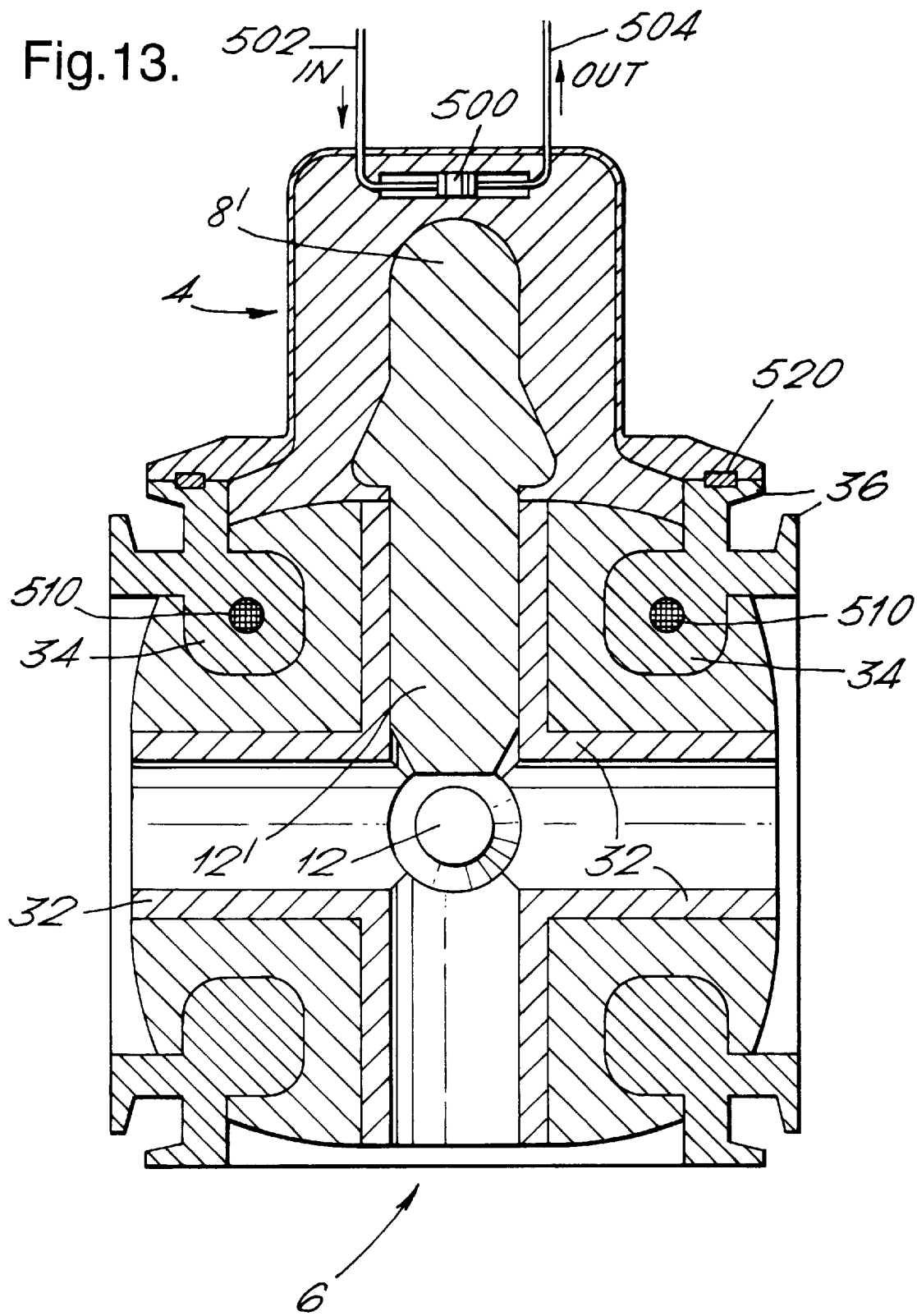
FIG. 13 is a modification of the arrangement of FIG. 7, incorporating sensing means.

FIG. 13 shows the arrangement of FIG. 7 modified to incorporate several sensing systems. A first sensing system comprises a non-linear optic cell 500 embedded in the insulation 10 prime of the termination 4 adjacent the metal core 8 prime. Such a sensor allows management of the electrical load of the arrangement, being selected to measure voltage or current, for example using the Faraday, Kerr or Mach-Zehnder effect Signals to and from the cell 500 are guided within optical fibres 502 and 504 respectively. A second sensing system comprises a coil winding 510 that extends through the earthed cage structure 34 of the adapter 6, looping around the socket 32 and pin 12 prime. By this system, the direction of current flow can be detected. Additionally or alternatively, a LOHET may be incorporated into the connector. A third sensing system comprises a pressure sensor 520 located between the mating flanges 18 prime and 36 of the termination 4 and the adapter 6 respectively, for indicating whether the fitting therebetween, and thus the electrical strength of the insulation interface, is of sufficient quality.

What is claimed is:

1. An electrical interconnection arrangement for connecting together two pieces of electrical equipment, comprising:
   (a) a first connection component comprising a first elongate conductive member, which in use is at a relatively high voltage, enclosed within insulating material and having a portion of the first conductive member protruding at one end of the first conductive member beyond an end surface of the insulating material, the other end of the first member being arranged for electrical connection with one of the pieces of electrical equipment, wherein said one end of the first conductive member has an enlarged radiussed region within the insulating material adjacent the protruding portion of the first conductive member thereby to provide electrical stress relief at the exposed surface of the insulating material, and
   (b) a second connection component comprising a second elongate conductive member enclosed within insulating material and having a socket exposed at an end surface thereof for receiving the protruding end of the first conductive member, the other end of the second member being arranged for electrical connection with the other of the pieces of electrical equipment;
   wherein a respective conductive layer extends over the surface of the insulating material of each connection component as its said one end and extends therealong towards its other end, thereby to provide electrical screening, which in use is substantially at earth potential, at said one end region of the component, each conductive layer terminating a respective first and second connection portions at respective one ends.

2. An electrical interconnection arrangement comprising:
   (a) a first, elongate, connection component comprising (i) a first conductive member enclosed within insulating material and providing a terminal at one end of the first conductive member, the other end of the first conductive member being arranged for electrical connection to a conductor of an electric cable, and (ii) a conductive layer extending over the surface of the insulating material at said one end and extending therealong towards the other end, thereby to provide electrical screening at one end region of the component, said conductive layer terminating in a connection portion at said one end region of the component; and (b) a second connection component comprising a body of electrically insulating material enclosing (i) an electrically conductive terminal arranged to be electrically connected to other electrical equipment, and to make electrical connection with the terminal of the first conductive member of the first connection component, and (ii) an electrically conductive structure located within the insulating body, spaced from and encircling the terminal of the second connection component, the electrically conductive structure being located within the insulating body and having an exposed portion at a surface of the insulating body to provide an external connection portion, whereby on engagement between the terminal of the first conductive member of the first connection component and the terminal of the second conduction component so as, in use, electrically to interconnect the electric cable to the other electrical equipment, the connection portions are arranged to co-operate to form an electrical connection therebetween to provide electrical screening.

3. An arrangement according to claim 2, wherein the terminal of the first connection component protrudes as a pin from the insulating material thereof, and wherein the terminal of the second connection component comprises a socket arranged to receive the pin.

4. An arrangement according to claim 2, wherein said one end of the conductive member of the first connection component has an enlarged radiussed region within the insulating material adjacent the protruding portion, thereby to provide electrical stress relief at the interface of the two connection components.

5. An arrangement according to claim 3 or claim 4, wherein that part of the conductive structure of the second connection component disposed within the insulating body has radiussed edges, thereby to provide electrical stress relief at the interface of the two connection components.

6. An arrangement according to claim 1 or claim 2, wherein the or each pair of mating faces of the insulating material of the first and second connection components is curved, and is of different curvature so as, on mating, to exclude air from the interface therebetween.

7. An arrangement according to claim 1 or claim 2, wherein each connection portion comprises a mating flange, and wherein the arrangement comprises clamping means to secure the flanges together.

8. An arrangement according to claim 1 or claim 2, wherein the electrical connection between the or each first connection component and the second connection component is a push-fit.

9. An arrangement according to claim 2, comprising at least one further first connection component, wherein the second connection component comprises at least one further said terminal that is electrically connected within the insulating body to said terminal and that is arranged to make electrical connection with the further first connection component, and wherein the electrically conductive structure extends so as to be spaced from and to encircle the further terminal within and at a surface of the insulating body so as to provide a further external connection portion for co-operating with the connection portion of the further first connection component to provide electrical screening, the one further first connection component including a protruding portion of an elongate conductive member for connection to the at least one terminal of the second component so as electrically to interconnect an electric cable with other electrical equipment connected to each of said terminals.

10. An arrangement according to claim 9, wherein the insulating body is multi-faceted and each of said terminals and associated connection portions are exposed at respective faces thereof for electrical connection to respective first connection components.

11. An arrangement according to claim 2, wherein an electric cable is connected to said other end of the, or a respective one of each, first connection component, wherein electric stress control material extends in electrical contact from the conductor of the cable to the conductive layer of the first connection component, which stress control material is enclosed by insulating material and by conductive material that is in electrical contact with the conductive material of the first connection component.

12. An arrangement according to claim 1 or claim 2, wherein said other end of the first connection component is exposed beyond its insulating material and spaced from its outer conductive layer.

13. An arrangement according to claim 3, wherein the second connection component comprises a larger number of sockets than the number of first connection components, the arrangement comprising a respective closure cap for the or each excess terminal, the closure cap comprising an insulating body, a projection extending from the cap insulation body so as mechanically to engage the socket, and an electrically conductive member for electrical engaging with the conductive structure of the insulating body of the second connection component.

14. An arrangement according to claim 1 or claim 2, wherein at least one of the first connection components and/or the closure caps comprises an external test point that is electrically coupled to its respective socket, when that component or cap is mounted on the second connection component.

15. An arrangement according to claim 1 or claim 2, wherein the first connection component is arranged to extend either substantially linearly or substantially in an L-shape away from the second connection component when connected to the second connection component.

16. An arrangement according to claim 2, comprising at least two of said second connection components ganged together.

17. An electrical interconnection arrangement according to claim 1 or 2, comprising means arranged to sense at least one of the voltage present therein, and the current flowing therein.

18. An electrical interconnection arrangement for connecting together two pieces of electrical equipment, the arrangement comprising:

a first connection component, the first connection component comprising:

an elongate first conductive member;

an insulating material layer around the first conductive member wherein the first conductive member includes a portion protruding from an end surface of the insulating material at one end of the first conductive member, the end surface of the insulating material having an enlarged radius region adjacent the protruding portion of the first conductive member configured to provide electrical stress relief at the end surface; and an electrical connection part at a second end of the first connection component opposite the protruding portion of the elongate conductive member, the electrical connection part being configured for electrical connection with one of the pieces of electrical equipment; and the arrangement further comprising a second connection component comprising:

an elongate second conductive member defining a socket at an end thereof configured to receive the protruding end of the first conductive member;

an electrical connection part at an opposite end of the second conductive member configured for electrical connection with the other of the pieces of electrical equipment; and the arrangement further comprising:

conductive layers that extend over the surface of the insulating material of each connection component at abutting ends when the protruding portion is received in the socket to provide electrical screening, each conductive layer terminating at respective first and second connection portions adjacent the abutting ends so as to be electrically connected when the protruding portion is received in the socket.

19. An electrical interconnection arrangement comprising:

an elongate first connection component comprising;

a first conductive member having a terminal at a first end thereof and an electrical connection part at an opposite second end thereof configured to provide an electrical connection to a conductor of an electric cable;

an insulating material around the first conductive member; and a conductive layer extending over the surface of the insulating material at the first end of the conductive member to provide electrical screening at one end region of the first connection component, the conductive layer terminating in a connection portion at a first end of the first connection component; and the arrangement further comprising a second connection component comprising:

a body of electrically insulating material;

an electrically conductive terminal within the insulating body and configured to be electrically connected to other electrical equipment and to the terminal of the first conductive member;

an electrically conductive structure located within the insulating body, spaced from and encircling the terminal of the second connection member, the electrically conductive structure having an exposed portion at a surface of the insulating body to provide an external connection portion; and wherein the external connection portion of the electrically conductive structure and the connection portion of the conductive layer of the first connection component form an electrical connection therebetween to provide electrical screening when the terminal of the first conductive member is electrically connected to the electrically conductive terminal of the second connection component to electrically connect the conductor of the electric cable and the other electrical equipment.

* * * * *